US006669100B1

(12) United States Patent
Rogers et al.

(10) Patent No.: US 6,669,100 B1
(45) Date of Patent: Dec. 30, 2003

(54) SERVICEABLE TAMPER RESISTANT PIN ENTRY APPARATUS

(75) Inventors: Ron W. Rogers, Suwanee, GA (US); Stephen J. Chasko, Flowery Branch, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/185,270

(22) Filed: Jun. 28, 2002

(51) Int. Cl.[7] ................................................ G06K 19/06

(52) U.S. Cl. ........................................ 235/492; 235/380

(58) Field of Search ................................ 235/492, 487, 235/486, 379, 380, 382, 382.5; 902/5, 26

(56) References Cited

U.S. PATENT DOCUMENTS 4,800,520 A * 1/1989 Iijima ........................ 235/380
4,968,873 A * 11/1990 Dethloff et al. ............. 235/380
5,406,619 A * 4/1995 Akhteruzzaman et al. .. 235/382
5,616,900 A * 4/1997 Seewoster ................... 235/379
5,739,510 A * 4/1998 Petit ........................... 235/380
6,032,135 A * 2/2000 Molano ....................... 705/41
6,220,510 B1 * 4/2001 Everett et al. .............. 235/380

* cited by examiner

*Primary Examiner*—Daniel St. Cyr
(74) *Attorney, Agent, or Firm*—Maginot, Moore & Bowman LLP

(57) ABSTRACT

A PIN device utilizes a preferably removable IC card to store and process data to provide a tamper resistant PIN entry system. The IC card is a tamper resistant module that provides four functions for the PIN device. The IC card: stores secure data for the PIN device; provides authentication for verifying that the IC card can be trusted; provides a mechanism for the loading of secure data into the PIN device; and provides a mechanism to authenticate its identity to other parties. The subject PIN entry system allows for servicing of the PIN device in the field.

20 Claims, 3 Drawing Sheets

SERVICEABLE TAMPER RESISTANT PIN ENTRY APPARATUS

FIELD OF THE INVENTION

The present invention relates generally to electronic terminals/devices that have a PIN/PAD module and, more particularly, to a tamper resistant PIN/PAD module for electronic terminals/devices.

BACKGROUND INFORMATION

PIN entry devices are utilized in a variety of electronic terminals and/or devices. Additionally, stand alone PIN entry devices are provided as peripherals to electronic terminals and/or devices such as retail terminals. Collectively, such PIN entry devices allow a user to enter his or her PIN (personal identification number) as an authentication precursor for performing various types of transactions. Typical transactions that require the input of a PIN include, but are not limited to, utilizing an ATM and other bank transactions, and providing authorization for a purchase utilizing a credit or debit card.

All of the transactions that require the entry of a PIN necessitate that the PIN itself and any data associated with the PIN and/or the transaction be secure and remain secure. As such, PIN entry devices utilize encryption in the form of keys to accomplish security. Additionally, PIN entry devices are designed to be tamper resistant security modules.

In order to provide a tamper resistant security module, PIN entry devices are sealed. If and/or when a PIN entry device is opened, all of the secure data is erased. As such, PIN entry devices are difficult, if not impossible, to service especially in the field. Once a PIN entry device is opened for servicing, all of the secure data must be reloaded. Reloading of the secure data must be performed in a secure manner. All of the above increases the cost of servicing PIN entry devices.

In view of the above, it would be advantageous to provide a tamper resistant PIN entry device that is serviceable in the field.

It would be further advantageous to provide a tamper resistant PIN entry device that allows for simple loading of keys and software therein.

It would be still further advantageous to provide a tamper resistant PIN entry device that allows for easy loading of different keys and/or key sets.

It would be even further advantageous to provide a tamper resistant PIN entry device that erases secure data when tampering occurs.

What is therefore needed is a tamper resistant PIN entry device that is serviceable in the field.

What is therefore further needed is a tamper resistant PIN entry device that allows for simple loading of keys and software therein.

What is therefore still further needed is a tamper resistant PIN entry device that allows for easy loading of different keys and/or key sets.

What is therefore even further needed is a tamper resistant PIN entry device that erases secure data when tampering occurs.

SUMMARY

The subject invention is a system, apparatus and/or method that provides a tamper resistant PIN entry device. Particularly, the subject invention is a tamper resistant PIN entry system, apparatus and/or method that utilizes a PIN entry device and removable IC card.

In one form, the subject invention provides a PIN entry apparatus. The PIN entry apparatus includes an IC card storing PIN processing data and procedures, and a PIN entry device having a PIN entry pad operable to receive PIN entry from a user. The PIN entry device is configured to removably receive the IC card and allow data communication between the IC card and the PIN entry device. The PIN processing procedures are operable to have the IC card receive and process the PIN entry.

In another form, the subject invention provides a PIN entry system. The PIN entry system includes an IC card and a PIN entry device. The IC card has an IC card processor, and memory containing IC card PIN processing data and procedures that are executable by the IC card processor. The PIN entry device has a PIN entry device processor, a PIN input device coupled to the PIN entry device processor and operable to receive PIN entry from a user, an IC card interface coupled to the processor and configured to removably receive the IC card, the IC card operable to allow data communication between the processor and the IC card, and memory coupled to the PIN entry device processor and containing program instructions executable by the PIN entry device processor and operable to cause the PIN entry device processor to operate the memory, the PIN input device, and the IC card interface, the PIN processing procedures operable to have the IC card receive and process the PIN entry.

In yet another form, the subject invention provides a method of processing PIN input. The method includes the steps of: (a) receiving a PIN input from a user on a PIN input device; (b) providing the PIN input to an IC card removably coupled to the PIN input device; and (c) processing the PIN input by the IC card.

In addition to other advantages, the subject invention provides lower costs in the manufacturing and/or servicing of PIN entry devices. As well, the subject invention greatly simplifies the key injection process. The subject invention allows for "in the field" replacement of the IC card. Proper labeling of various IC cards containing various keys allows for simple verification that the proper keys are loaded within the PIN entry device.

BRIEF DESCRIPTION OF THE DRAWINGS

Corresponding reference characters indicate corresponding parts throughout the several views.

DETAILED DESCRIPTION OF THE INVENTION

Figure 1:
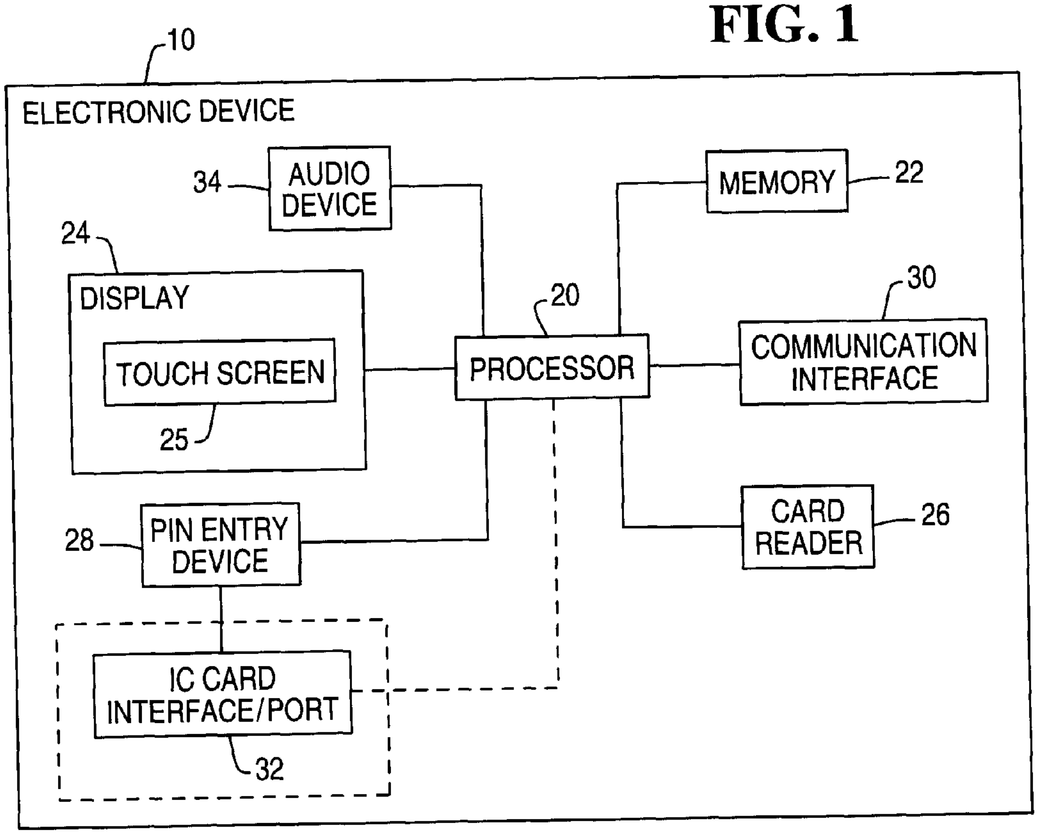
FIG. 1 is a block diagram representation of an exemplary generic electronic device having a PIN entry device in accordance with the principles of the subject invention.

Referring to FIG. 1, there is depicted a block representation of an electronic apparatus or device generally designated 10 in which the subject invention may be embodied and/or used. Particularly, the electronic device 10 is illustrative of any electronic device that has a personal identification number (PIN) entry and/or capture device 28. Without being limiting, such an electronic device 10 includes a retail terminal (assisted checkout terminal or unassisted/self checkout terminal), an ATM, kiosk, communications device, or the like.

The electronic device 10 includes a processor 20 that may be embodied as a microprocessor, digital signal processor, processing unit, processing means, processing circuitry/logic or the like. The processor 20 may be specific to the device or functionality (e.g. a custom IC) or may be a general processor. Memory 22 is coupled to and/or in communication with the processor 20. The memory 22 may be RAM, ROM, EEPROM, DRAMM, SDRAM, and/or a combination of these types of memory, or any other memory such as is known in the art. It should be appreciated that the memory 22 may be a single memory IC and/or storage device, or a plurality of memory ICs and/or storage devices. The memory 22 stores program instructions that are executable by the processor 20. The processor 20 utilizes the program instructions to control the various components of the electronic device 10 including peripherals thereof, if any, and/or data between, to and/or from the various components, external components, and/or external peripherals. The program instructions provide functionality for and/or of the electronic device 10 and/or the various components of the electronic device 10 as described herein. The memory 22 also stores data that may be generated by the electronic device 10, loaded into the memory 22 via an external device and/or component, and/or generated by an external device and/or component. Further, the memory 22 also stores encryption keys, BIOS, an operating system, and/or the like.

In one form, the processor 20 represents a plurality of processors, each one of which performs various functions with respect to the electronic device 10. For example and without being limiting, the electronic device 10 may have three (3) processors. One (1) processor of the three (3) processors may provide encryption processing. Another processor of the three (3) processors may provide data processing, while the third processor of the three (3) processors may provide component control processing. In all cases, memory stores program instructions necessary for the processors to operate accordingly.

The electronic device 10 also includes a display 24 that is coupled to and/or in communication with the processor 20 either through a video adaptor (not shown) or not. The display 24 may be any type of display such as a CRT, LCD screen, or the like. The display 24 is configured, adapted and/or operable to provide video, images, text, and/or the like. A touch-screen 25 may be provided on or over the display 24. The touch screen 25 is coupled to and/or in communication with the processor 20. The touch screen 25 is configured, adapted and/or operable to accept or obtain input from a user, the input corresponding to location of touch by a user. The location of touch is correlated to an underlying image on the display 24. In this manner, the display 24 may provide an image of a keypad with a plurality of keys while the touch screen 25 provides an input or key selection device or function for the video keypad.

The electronic device 10 also includes a card reader 26 that is coupled to and/or in communication with the processor 20. The card reader 26 is configured, adapted and/or operable to read credit cards, debit cards and the like (i.e. magnetic strip-type cards), smart cards or the like (i.e. electronic or IC cards), transponder-type cards, or any other type of card (collectively, "cards"). The card reader "reads" the cards by obtaining information/data contained on and/or in the particular card. The card reader 26 may also provide information/data to the card and thus be able to write to the card.

A PIN entry device, module or the like 28 may also be provided as part of the electronic device 10. The PIN entry device 28 is coupled to and/or in communication with the processor 20 and is preferably a self-contained module. More preferably, the PIN entry device 28 is a tamper resistant, self-contained module. The PIN entry device 28 includes a plurality of keys, buttons or input selectors (not specifically shown on the PIN entry device 28 of FIG. 1). Collectively, and without being limiting, these keys allow a user to select and input a PIN via numbered keys, clear an input and/or transaction, delete and input, enter an input or transaction, as well as provide for other typical functionality. The PIN entry device 28 may also provide for service input by a technician or other service personnel. As such, the PIN entry device 28 is configured, adapted and/or operable to accept user input and provide the user input to the processor 20 and/or the other components of the electronic device 10, external devices and/or components, if any that are in communication with the electronic device 10, and peripherals, if any, that are coupled to the electronic device 10.

The electronic device 10 also includes a communications interface 30 that is coupled to and/or in communication with the processor 20. The communications interface 30 is configured, adapted and/or operative to provide data communications with peripherals of the electronic device 10, other electronic devices, a network and/or the like. Without being limiting, the communications interface 30 may be a modem or any kind, network circuitry/logic, and/or the like.

The electronic device 10 may also include an audio device 34 that is coupled to and/or in communication with the processor 20 either through an audio interface (not shown) or not. In one form, the audio device 34 comprises a speaker. The audio device 34 is configured, adapted and/or operable to produce audio such as speech, music, and/or the like. As such, the audio device 34 may include a speech synthesizer (not shown).

Further, in accordance with an aspect of the subject invention, the electronic device 10 includes an IC card interface/port 32. Particularly, the IC card interface/port 32 represents a physical port into which an IC card can be removably inserted, physical terminals providing the interface between the IC card and the PIN entry device 32, and any circuitry/logic necessary to implement the former two representations. While the IC card interface/port 32 may be coupled to and/or in communication with the processor 20 as indicated by the dashed line connecting the two components, the IC card interface/port 32 is coupled to and/or in communication with the PIN entry device 28. Particularly and preferably, since the PIN entry device 28 as stated above is a self-contained module, the IC card interface/port PIN entry device 28 is coupled to and/or in communication with the PIN entry device 28 and/or part of the PIN entry device 28 as indicated by the dashed lines emanating from the PIN entry device block and surrounding the IC card interface/port block.

The IC card interface/port 28 is configured, adapted and/or operable to removably receive an IC card, retain the IC card once inserted, and obtain (read) information/data from the IC card in accordance with the procedure(s) and/or processes described herein. The IC card interface/port 28 may also be operable to write information/data to the IC card in accordance with the procedure(s) and/or processes described herein. In one form, the PIN entry device 28 and its associated program instructions, circuitry and/or logic, and the IC card interface/port 28 along with is associated program instructions and circuitry and/or logic comprise a PIN entry system.

It should be appreciated that since the electronic device 10 may take many forms, some components described above in connection with the electronic device 10 may not necessarily be a part of a particular electronic device. As an example, in the case that PIN entry is generated on the display 24 and user input is obtained from the touch screen 25, there is no need for a separate PIN entry device 28. This may be the case when the PIN entry device is a stand-alone peripheral such as a signature capture terminal.

Figure 2:
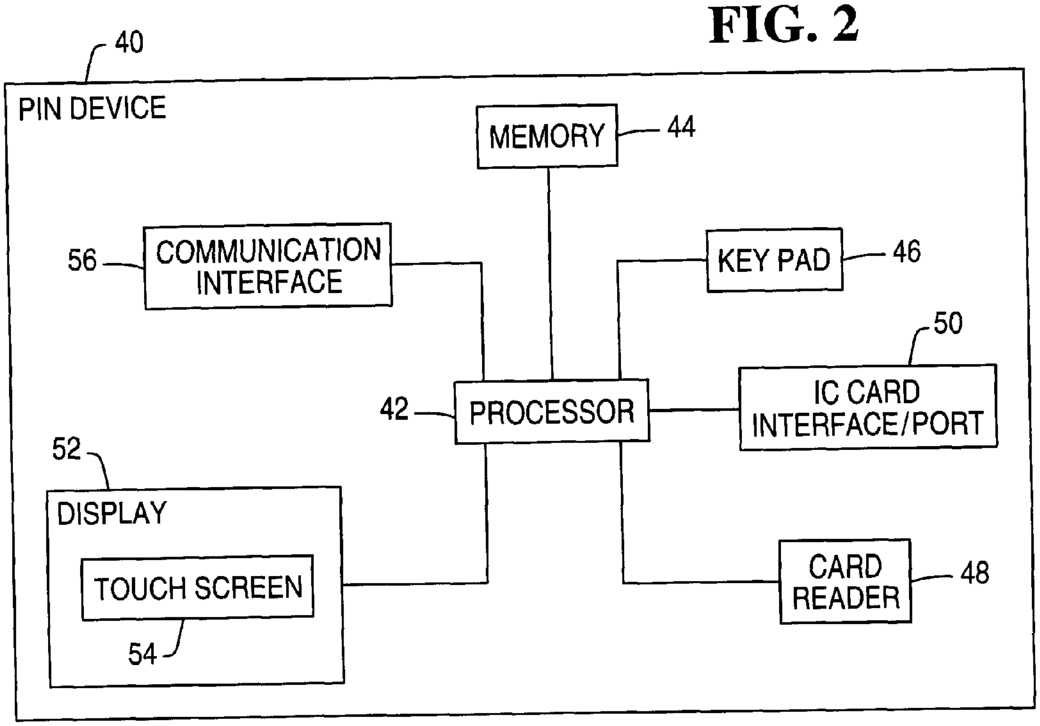
FIG. 2 is a block diagram representation of an exemplary PIN entry device in accordance with the principles of the subject invention.

Referring now to FIG. 2, there is depicted a block diagram representation of a generic stand-alone PIN entry apparatus or device generally designated 40 forming a part of the subject invention. Without being limiting, the PIN entry device 28 may comprise a stand-alone or peripheral PIN device that is adapted to be coupled to an electronic device, a signature capture terminal, a keypad with discrete, physical keys, a virtual keypad generated on a display of any type, an access identification/security device, a credit/debit authorization terminal, and/or the like.

The PIN entry device 40 includes a processor 42 that may be embodied as a microprocessor, digital signal processor, processing unit, processing means, processing circuitry/logic or the like. The processor 42 may be specific to the device or functionality (e.g. a custom IC) or may be a general processor. Memory 44 is coupled to and/or in communication with the processor 42. The memory 44 may be RAM, ROM, EEPROM, DRAMM, SDRAM, and/or a combination of these types of memory, or any other memory such as is known in the art. It should be appreciated that the memory 44 may be a single memory IC and/or storage device, or a plurality of memory ICs and/or storage devices. The memory 44 stores program instructions that are executable by the processor 42. The processor 42 utilizes the program instructions to control the various components of the PIN device 40 including peripherals thereof, if any, and/or data between, to and/or from the various components, external components, and/or external peripherals. The program instructions provide functionality for and/or of the PIN device 40 and/or the various components of the PIN device 40 as described herein. The memory 44 may also store data that may be generated by the PIN device 40, loaded into the memory 4 via an external device such as an IC card and/or component, and/or generated by an external device and/or component. Further, the memory 44 may also store encryption keys loaded therein, BIOS, an operating system, and/or the like.

In one form, the processor 42 represents a plurality of processors, each one of which performs various functions with respect to the PIN device 40. For example and without being limiting, the PIN device 40 may have three (3) processors. One (1) processor of the three (3) processors may provide encryption processing. Another processor of the three (3) processors may provide data processing, while the third processor of the three (3) processors may provide component control processing. In all cases, memory stores program instructions necessary for the processors to operate accordingly.

The PIN device 40 may also include a display 52 that is coupled to and/or in communication with the processor 42 either through a video adaptor (not shown) or not. The display 52 may be any type of display such as a CRT, LCD screen, or the like. The display 52 is configured, adapted and/or operable to provide video, images, text, and/or the like. A touch-screen 54 may be provided on or over the display 52. The touch screen 54 is coupled to and/or in communication with the processor 42. The touch screen 54 is configured, adapted and/or operable to accept or obtain input from a user, the input corresponding to location of touch by a user. The location of touch is correlated to an underlying image on the display 52. In this manner, the display 52 may provide an image of a keypad with a plurality of keys while the touch screen 54 provides an input or key selection device or function for the video keypad.

The PIN device 40 also includes a card reader 48 that is coupled to and/or in communication with the processor 42. The card reader 48 is configured, adapted and/or operable to read credit cards, debit cards and the like (i.e. magnetic strip-type cards), smart cards or the like (i.e. electronic or IC cards), transponder-type cards, or any other type of card (collectively, "cards"). The card reader "reads" the cards by obtaining information/data contained on and/or in the particular card. The card reader 48 may also provide information/data to the card and thus be able to write to the card.

The PIN device 40 also includes a communications interface 56 that is coupled to and/or in communication with the processor 42. The communications interface 56 is configured, adapted and/or operative to provide data communications with peripherals of the PIN device 40, other electronic devices, a network and/or the like. Without being limiting, the communications interface 56 may be a modem or any kind, network circuitry/logic, and/or the like.

Further, in accordance with an aspect of the subject invention, the PIN device 40 includes an IC card interface/port 50. Particularly, the IC card interface/port 50 represents a physical port into which an IC card can be removably inserted, physical terminals providing the interface between the IC card and the PIN device 40, and any circuitry/logic necessary to implement the former two representations.

The IC card interface/port 50 is configured, adapted and/or operable to removably receive an IC card, retain the IC card once inserted, and obtain (read) information/data from the IC card in accordance with the procedure(s) and/or processes described herein. The IC card interface/port 50 may also be operable to write information/data to the IC card in accordance with the procedure(s) and/or processes described herein. In one form, the PIN device 40 and its associated program instructions, circuitry and/or logic, and the IC card interface/port 50 along with is associated program instructions and circuitry and/or logic comprise a PIN entry system.

The PIN device 40 may also include a keypad 46 comprising a plurality of physical keys. The plurality of keys allows input from a user that allow a user to select and input a PIN via numbered keys, clear an input and/or transaction, delete and input, enter an input or transaction, as well as provide for other typical functionality. The PIN device 40 may also provide for service input by a technician or other service personnel. As such, the PIN device 40 is configured, adapted and/or operable to accept user input and provide the user input to the processor 42 and/or the other components of the PIN device 40, external devices and/or components, if any that are in communication with the PIN device 40, and peripherals, if any, that are coupled to the electronic device 40.

It should be appreciated that since the PIN device 40 may take many forms, some components described above in connection with the PIN device 40 may not necessarily be a part of a particular electronic device. As an example, in the case that PIN entry is generated on the display 24 and user input is obtained from the touch screen 25, there is no need for a keypad 46. This may be the case when the PIN entry device is a stand-alone peripheral such as a signature capture terminal. Alternatively, a keypad 46 may be provided along with a display 52, but without the touch-screen 54. In this manner, physical keys are utilized for user input while the display is utilized to provided information, instructions and/or messages to the user.

Figure 3:
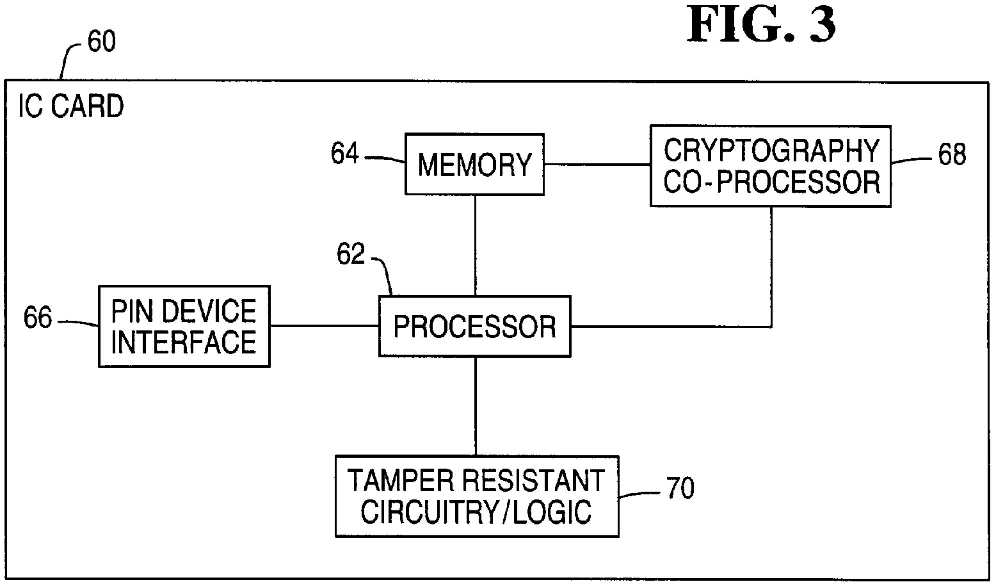
FIG. 3 is a block diagram representation of an exemplary IC card utilized in the subject tamper resistant PIN entry system in accordance with the principles of the subject invention.

Referring now to FIG. 3, there is depicted a block diagram representation of an exemplary IC card, generally designated 60, in accordance with the principles of the subject invention. In one form, the IC card 60 may be a smart card. The IC card 60 may take other forms that provide the functionality set forth herein. In all cases, the IC card is a tamper resistant security module. It works with the PIN entry devices 10, 40 to create a secure PIN entry device and/or system. More specific functionality is described below. The IC card 60 includes a processor 62 that may be embodied as a microprocessor, digital signal processor, processing unit, processing means, processing circuitry/logic or the like. The processor 62 may be specific to the device or functionality (e.g. a custom IC) or may be a general processor.

The IC card 60 may also include a cryptography co-processor 68 that may be coupled to and/or in communication with the processor 62. The cryptography co-processor 68 provides encryption and/or encoding processing for the functionality described herein. While not shown, the IC card 60 may include other processors and/or co-processors that provide specific processing of particular functionality.

Memory 64 is coupled to and/or in communication with the processor 62 and or the co-processor 68. The memory 64 may be RAM, ROM, EEPROM, DRAMM, SDRAM, and/or a combination of these types of memory, or any other memory such as is known in the art. It should be appreciated that the memory 64 may be a single memory IC and/or storage device, or a plurality of memory ICs and/or storage devices. The memory 64 stores program instructions that are executable by the processors 62 and 68. The processor 62 utilizes the program instructions to control the various components of a PIN device to which it is coupled, including peripherals thereof, if any, and/or data between, to and/or from the various components, external components, and/or external peripherals. The co-processor 68 utilizes the program instructions to control encoding, decoding, encrypting and/or decrypting of data as necessary to accomplish its functionality as set forth herein. In general, the program instructions provide functionality for and/or of the IC card 60 and/or the various components of the IC card 60 as described herein. The memory 64 may also store data such as secure data that may be generated by the IC card 60, generated by a PIN entry device, and/or previously loaded into the memory 64. Further, the memory 64 may also store encryption keys loaded therein, a BIOS, an operating system, and/or the like. The IC card 60 follows ANSI rules of PIN storage and encryption.

The IC card 60 also includes tamper resistant circuitry/logic 70 that monitors and/or detects whether the IC card is being tampered with (e.g. whether there is an attempt to physically break into or open the IC card 60) and/or electronically enter the IC card 60. The tamper resistant circuitry/logic 70 may take forms such as known in the art such as light sensitive circuitry/logic. In any form, the tamper resistant circuitry/logic 70 functions to cause all secure data stored in the IC card 60 to be erased upon tamper detection. The subject PIN entry system is tamper resistant. As such, the PIN entry device 28 is preferably a sealed module that includes various tamper detection processes, procedures and/or devices.

As indicated above, the PIN entry device 28, 40 removably receives the IC card 60. The IC card 60 and the PIN entry device cooperate to exchange data, program instructions, and/or the like. Additionally, the IC card 60 provides a tamper resistant medium for performance of the various functions. Particularly, the IC card 60 is operable to perform four basic functions, procedures and/or processes. A first function is the storage of secure data. The secure data is preferably loaded into the IC card 60 at a manufacturing facility or any remote and secure location. The secure data may be used for encrypting PIN data, providing MAC (message authentication code) functionality of account data or binding data elements in a secure manner.

A second function is the authentication processes to verify that the IC card 60 can be trusted with respect to the PIN entry device. As an example, the BIOS of the PIN entry device may be operable to create a secure HASH upon boot of the PIN entry device that may be performed upon insertion of the IC card 60 into the IC card interface/port 32, 50. This HASH is transmitted from the PIN entry device via the IC card interface/port 32, 50 to the IC card 60. The IC card 60 verifies itself via processing of the HASH. In this instance, once verification is successful, processing continues. If verification fails, processing stops. The IC card 60 then erases all secure data and/or program instructions stored therein. Additionally, this second function may also include the verification of outside applications.

A third function that the IC card provides is the loading of secure data and/or program instructions from the IC card 60 into the PIN entry device 28, 40. This may be used to load payment keys into the PIN entry device 28, 40. This is preferably performed under a particular session key that prevents revealing the secure data. A fourth function that the IC card provides is a mechanism for authentication of its own identity to other parties. Collectively, the functions and/or functionality may be termed PIN processing procedures, while the information and/or data may be collectively termed PIN data.

The subject PIN entry system also ensures that each entered PIN digit is encoded appropriately. Therefore, each entered digit is preferably sent to the IC card 60 for processing. Should a successful attack be performed on the system outside the IC card, the above scheme allows for only one PIN digit to ever be obtained. As such, the interface between the IC card and the PIN entry device must allow for PIN digits to be send, PIN digit entry to be cancelled, PIN digits to be cleared, and provide an ENTER function that forces encryption of the PIN data.

The subject PIN entry system provides monitoring for unauthorized entry into the IC card 60, the PIN entry device 28 or 40, and/or both. As an example, to effect such monitoring, a tamper switch may be provided on the PIN entry device. In any case, when unauthorized entry is detected, the system will erase data used to verify the application to each other. As well, all other secure data such as keys may be erased. The subject system also provides for the secure loading of program instructions from the IC card 60 into the PIN entry device 28 or 40. Authentication data would thus be transmitted between the IC card 60 and the PIN entry device 28 or 40 before new program instructions were loaded into the PIN entry device.

It can be appreciated that the subject system provides for secure touch and PIN entry. As well, the subject system can accept biometric data in a manner that can ensure privacy. It can display PIN entry forms and ensure that rogue applications are not loaded therein that could be used to fraudulently collect PIN data.

Figure 4:
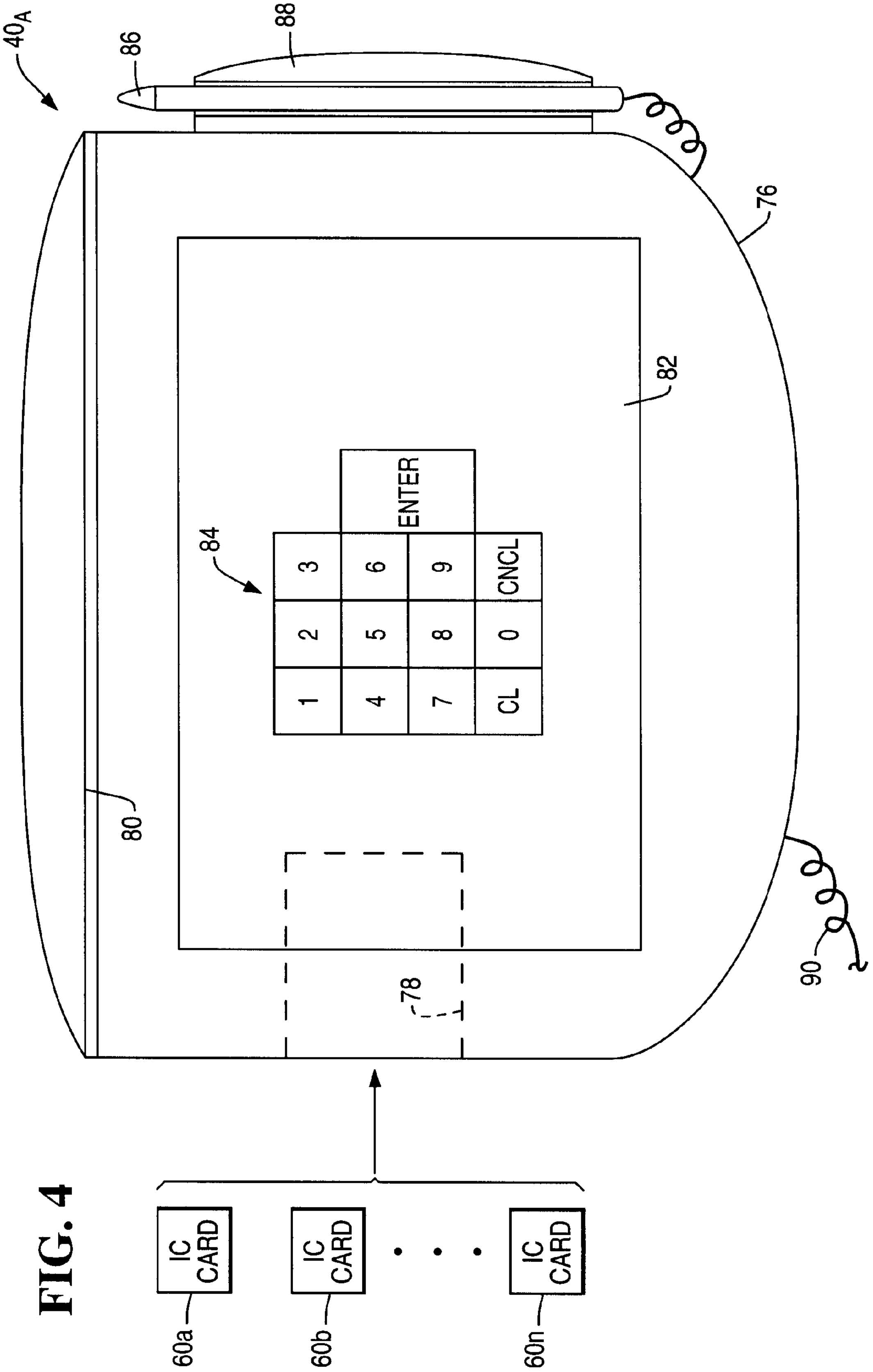
FIG. 4 is a top plan view of an exemplary signature pad incorporating the subject tamper resistant PIN entry system illustrating the use of IC cards containing various encryption keys and secure data in accordance with the principles of the subject invention.

Referring now to FIG. 4 there is depicted a signature capture terminal, generally designated $\mathbf{40}_A$ as an exemplary PIN entry device. Particularly, the signature capture terminal $\mathbf{40}_A$ may be a signature capture terminal made by NCR corporation of Dayton, Ohio. Shown with the signature capture terminal $\mathbf{40}_A$ is a plurality of IC cards labeled $\mathbf{60}_A$, $\mathbf{60}_B$ through $\mathbf{60}_n$. While it should be appreciated from the above that the subject PIN entry system includes a PIN entry device and only one IC card, multiple IC cards $\mathbf{60}_A$, $\mathbf{60}_B$ through $\mathbf{60}_n$ are shown to illustrate that separate and various IC cards may be used to provide specific key sets. This may be accomplished by color coding and/or labeling on the IC card itself. For example, one of the IC cards may contain a DUKPT key from XYZ debit network. This IC card may be color coded blue and/or be labeled XYZ. Another one of the IC cards may contain a DUKPT key from ABC credit network. Of course, other keys and/or networks may be used.

The signature capture terminal $\mathbf{40}_A$ is a specific example of the PIN entry device 40 and includes a housing 76 that has an IC card interface/port 78 for removably receiving one of the IC cards $\mathbf{60}_A$, $\mathbf{60}_B$ through $\mathbf{60}_n$. The housing 76 also has a card reader slot 80 for accepting and reading a user's card. A touch screen/display 82 is supported by the housing 76 and is depicted having a video keypad 84. The video keypad 84 includes ten digit keys 1–9 and 0, a clear key CL, a cancel key CNCL, and an ENTER key. The touch-screen/display 82 is operable to provide text and/or other images. A stylus 86 for writing on the touch-screen/display 82 is provided and coupled to the signature terminal $\mathbf{40}_A$. The stylus 86 is releasably retained on a stylus holder 88. The signature capture terminal $\mathbf{40}_A$ is typically a peripheral and thus includes a communication line 90. The IC card and the signature capture terminal $\mathbf{40}_A$ functions in the manner set forth herein, includes the components necessary for such functionality as described herein, and may be considered a PIN entry system.

Figure 5:
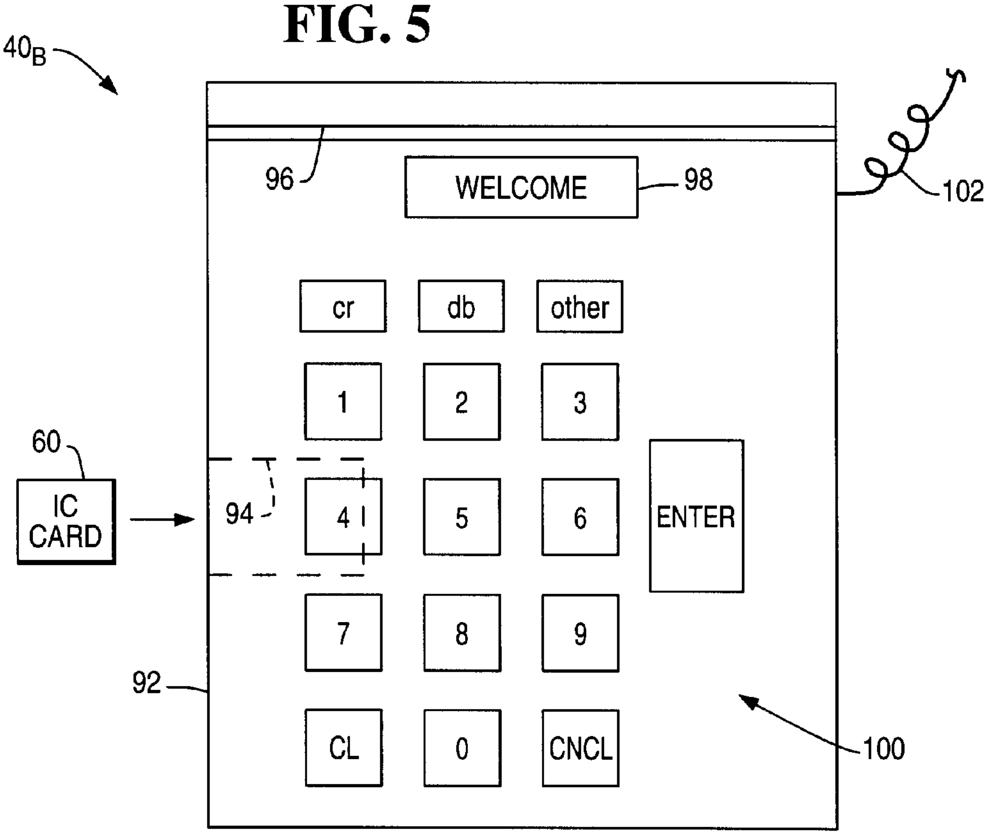
FIG. 5 is a top plan view of an exemplary PIN entry pad incorporating the subject tamper resistant PIN entry system in accordance with the principles of the subject invention.

Referring to FIG. 5, there is depicted a magnetic strip card PIN entry device, generally designated $\mathbf{40}_B$, as a specific example of the PIN entry device 40. The magnetic strip card PIN entry device $\mathbf{40}_B$, includes a housing 92 that has an IC card interface/port 94 for removably receiving an IC card 60. The housing 92 also has a card reader slot 96 for accepting and reading a user's magnetic strip-type card. A physical keypad 100 is provided that. The keypad 100 includes ten digit keys 1–9 and 0, a clear key CL, a cancel key CNCL, an ENTER key, a credit card key, CR, a debit card key, DB, and an OTHER key. The display 98 is operable to provide text and/or other images. The magnetic strip card PIN entry device $\mathbf{40}_B$, is typically a peripheral and thus includes a communication line 102. The IC card 60 and the magnetic strip card PIN entry device $\mathbf{40}_B$ functions in the manner set forth herein, includes the components necessary for such functionality as described herein, and may be considered a PIN entry system.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A PIN entry apparatus comprising:

a housing;

a card reader carried by said housing and operative to obtain PIN data from a card of a user;

a PIN entry pad carried by said housing and operative to receive PIN input from a user;

a PIN entry processor within said housing and in communication with said PIN entry pad and said card reader; and an IC card interface carried by said housing and in communication with said PIN entry processor, said IC card interface operative to receive an IC card and allow said processor to obtain secure PIN processing procedures carried by the IC card;

the PIN entry processor utilizing the secure PIN operating procedures received from the IC card to process the PIN input received from the user against the PIN data received from said card of the user.

2. The PIN entry apparatus of claim 1, wherein said IC card comprises a smart card.

3. The PIN entry apparatus of claim 1, wherein said secure PIN processing procedures include secure PIN processing data.

4. The PIN entry apparatus of claim 3, wherein said secure PIN processing data includes payment keys.

5. The PIN entry apparatus of claim 1, wherein said PIN processing procedures are operative to provide authentication to said PIN entry device to verify whether said IC card is legitimate.

6. The PIN entry apparatus of claim 1, wherein said PIN processing procedures are operative to erase said PIN processing data if said IC card is not legitimate.

7. The PIN entry apparatus of claim 1, wherein said PIN processing data comprises encryption keys.

8. The PIN entry apparatus of claim 1, wherein said PIN processing procedures are operative to provide authentication to a third party to verify whether IC card is legitimate or not.

9. A PIN entry system comprising:

an IC card having:

an IC card processor; and memory containing PIN processing procedures; and a PIN entry device having:

a PIN entry device processor;

a PIN input device coupled to said PIN entry device processor and operative to receive PIN entry from a user;

a card reader operative to obtain PIN data from a card of a user;

an IC card interface coupled to said PIN entry device processor, said IC card interface configured to removably receive said IC card and operative to allow data communication between said PIN entry device processor and said IC card to obtain the PIN processing procedures from the IC card; and memory coupled to said PIN entry device processor and storing said PIN processing procedures for execution by said PIN entry device processor and operative to cause said PIN entry device processor to obtain the PIN data from the card of the user via said card reader, obtain the PIN entry from the user via said PIN input device and process the PIN input relative to the PIN data utilizing said PIN processing procedures.

10. The PIN entry system of claim 9, wherein said IC card comprises a smart card.

11. The PIN entry system of claim 9, wherein said secure PIN processing procedures include secure PIN processing data.

12. The PIN entry system of claim 11, wherein said secure PIN processing data includes payment keys.

13. The PIN entry system of claim 11, wherein said PIN processing data comprises encryption keys.

14. The PIN entry system of claim 9, wherein said PIN processing procedures are operative to provide authentication to said PIN entry device to verify whether said IC card is legitimate.

15. The PIN entry system of claim 9, wherein said PIN processing procedures are operative to erase said PIN processing data if said IC card is not legitimate.

16. The PIN entry system of claim 9, wherein said PIN processing procedures are operative to provide authentication to a third party to verify whether IC card is legitimate or not.

17. A method of processing PIN input comprising the steps of:

receiving PIN data from a card of a user via a PIN input device;

receiving a PIN input from a user on a the PIN input device;

obtaining PIN processing procedures from an IC card removably coupled to the PIN input device by the PIN input device; and processing the received PIN input relative to the received PIN data, the PIN input device utilizing the PIN processing procedures obtained from the IC card.

18. The method of claim 17, further comprising the step of:

obtaining secure PIN processing data by the PIN input device.

19. The method of claim 18, wherein the step of obtaining secure PIN processing data by the PIN input device includes obtaining secure PIN processing data by the PIN input device in the form of payment keys.

20. The method of claim 17, further comprising the step of obtaining authentication by the PIN input device to verify whether the IC card is legitimate before PIN input.

* * * * *